(12) United States Patent
Horiguchi

(10) Patent No.: US 10,302,851 B2
(45) Date of Patent: May 28, 2019

(54) DISPLAY APPARATUS

(71) Applicant: Sakai Display Products Corporation, Sakai-shi, Osaka (JP)

(72) Inventor: Yuki Horiguchi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/317,016

(22) PCT Filed: Jul. 17, 2014

(86) PCT No.: PCT/JP2014/069104
§ 371 (c)(1),
(2) Date: Dec. 7, 2016

(87) PCT Pub. No.: WO2016/009543
PCT Pub. Date: Jan. 21, 2016

(65) Prior Publication Data
US 2017/0131463 A1 May 11, 2017

(51) Int. Cl.
*F21V 8/00* (2006.01)
*G02F 1/1333* (2006.01)

(52) U.S. Cl.
CPC .......... *G02B 6/0088* (2013.01); *G02B 6/009* (2013.01); *G02B 6/0085* (2013.01);
(Continued)

(58) Field of Classification Search
CPC .................................................. G02B 6/0088
See application file for complete search history.

(56) References Cited

U.S. PATENT DOCUMENTS

2008/0088763 A1* 4/2008 Toriyama ............. G02B 6/0091
349/58
2012/0281148 A1* 11/2012 Yoshikawa .......... G02B 6/0091
348/725
(Continued)

FOREIGN PATENT DOCUMENTS

CN 103307509 A 9/2013
JP 2013-69423 A 4/2013
(Continued)

*Primary Examiner* — Anh T Mai
*Assistant Examiner* — Zachary J Snyder
(74) *Attorney, Agent, or Firm* — Rudy J. Ng; Bret E. Field; Bozicevic, Field & Francis LLP

(57) ABSTRACT

A display apparatus includes: a substrate (32) provided with one surface on which a light emitting element (31) is mounted; a light guide plate (5) which is provided with one side surface facing the one surface of the substrate (32) and emits light from one surface of the light guide plate (5), the light being emitted from the light emitting element (31) and entering the light guide plate (5) through the one side surface; a display panel (2) which displays an image with light from the light guide plate (5); and a holding section (8A) which holds the display panel (2), and at least one contact prevention section (81) is arranged between the substrate (32) and the light guide plate (5), in a direction where the one surface of the substrate (32) faces the one side surface of the light guide plate (5), a size of the at least one contact prevention section is larger than that of the light emitting element (31) and is provided in the holding section (8A) to prevent contact of the substrate (32) and the light guide plate (5).

8 Claims, 6 Drawing Sheets

(52) U.S. Cl.
CPC .................. *G02F 1/133308* (2013.01); *G02F 2001/13332* (2013.01); *G02F 2001/133317* (2013.01)

(56) References Cited

U.S. PATENT DOCUMENTS

2013/0070479 A1   3/2013   Ito
2013/0235302 A1   9/2013   Jeon et al.

FOREIGN PATENT DOCUMENTS

JP         2013-157268 A   8/2013
WO    WO2013069552 A1   5/2013

\* cited by examiner

F I G. 1
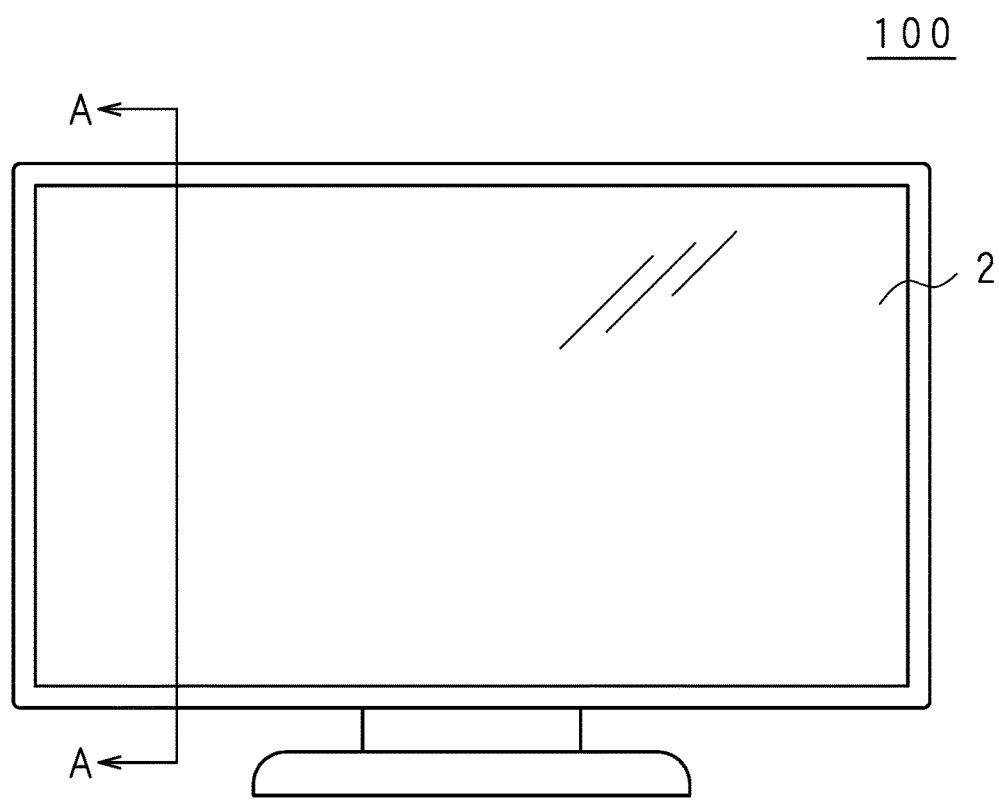

DISPLAY APPARATUS

This application is the national phase under 35 U.S.C. § 371 of PCT International Application No. PCT/JP2014/069104 which has an International filing date of Jul. 17, 2014 and designated the United States of America.

BACKGROUND

Technical Field

The present invention relates to a display apparatus comprising: a substrate provided with one surface on which a light emitting element is mounted; and a light guide plate which is provided with one side surface facing the one surface of the substrate, which receives light emitted by the light emitting element through the one side surface and which emits the light from one surface, the display apparatus displaying an image with light from the light guide plate.

Description of Related Art

In a case of a so-called edge type in which light is emitted from near a side surface of a liquid crystal panel, a light guide plate which guides light emitted by a light source to the liquid crystal panel and a reflective sheet which reflects light entering from the light source to the light guide plate toward the liquid crystal panel are generally provided at a region facing a back surface of the liquid crystal panel.

In such an edge type, the light source is arranged as much as possible close to a side surface of the light guide plate in order to enhance brightness.

However, a problem arises that in a case where the light guide plate expands due to heat emitted by the light source, an end portion of the light guide plate arranged proximate to the side surface hits the light source and the light source may be damaged.

On such a problem, Japanese Patent Laid-Open Publication No. 2013-157268 discloses that in a display apparatus, a backlight device comprises: a light emitting diode; a light guide plate which is provided with a light entrance surface through which light emitted by the light emitting diode enters to the light guide plate, guides the light emitted by the light emitting diode in a predetermined propagation direction and emits the light towards a liquid crystal panel; and further a contact prevention member which is arranged in the vicinity of an end portion of the light guide plate arranged proximate to the liquid crystal panel and prevents contact of the light emitting diode and the light entrance surface.

However, in the backlight device of Japanese Patent Laid-Open Publication No. 2013-157268, there is a problem that the contact prevention member cannot prevent the contact of the light emitting diode and the light entrance surface in a case where during the operation of the backlight device the light guide plate thermally expands due to excessive heat from the light emitting diode or an impact is made from the outside due to a certain cause.

In other words, in the backlight device of Japanese Patent Laid-Open Publication No. 2013-157268, there is a problem that it is not possible to completely prevent the contact of the light emitting diode and a side surface (the light entrance surface) of the light guide plate.

The present invention has been made in consideration of such a situation, and an object thereof is to provide a display apparatus comprising: a substrate provided with one surface on which a light emitting element is mounted; a light guide plate which is provided with one side surface facing the one surface of the substrate, which receives light emitted by the light emitting element through the one side surface and which emits the light from one surface; a display panel which displays an image with light from the light guide plate; and a holding section which holds the display panel, wherein at least one contact prevention section is arranged between the substrate and the light guide plate, has a size in a direction where the one surface of the substrate faces the one side surface of the light guide plate which is larger than that of the light emitting element, is provided in the holding section and prevents contact of the substrate and the light guide plate, which prevents an end portion of the light guide plate arranged proximate to the one side surface of the light guide plate from hitting the light emitting element so as to damage the light emitting element.

According to one embodiment of the present invention, there is provided a display apparatus which includes a substrate provided with one surface on which a light emitting element is mounted; a light guide plate which is provided with one side surface facing the one surface of the substrate and emits light from one surface of the light guide plate, the light being emitted from the light emitting element and entering the light guide plate through the one side surface; a display panel which displays an image with light from the light guide plate; and a holding section which holds the display panel, wherein at least one contact prevention section, which is arranged between the substrate and the light guide plate to prevent contact of them, is provided in the holding section along a thickness direction of the light guide plate, and in a direction where the one surface of the substrate faces the one side surface of the light guide plate, a size of the at least one contact prevention section is larger than that of the light emitting element.

In the embodiment of the present invention, the at least one contact prevention section provided in the holding section is arranged between the substrate and the light guide plate, and in the direction where the one surface of the substrate faces the one side surface of the light guide plate, the size of the at least one contact prevention section is larger than that of the light emitting element, which prevents the contact of the substrate and the light guide plate even in a case where the light guide plate is displaced proximate to the substrate.

In the display apparatus according to the embodiment of the present invention, a plurality of the contact prevention sections may be arranged at a plurality of places along the one surface of the substrate.

In the embodiment of the present invention, the plurality of contact prevention sections may be arranged at the plurality of places along the one surface of the substrate and prevent the contact of the substrate and the light guide plate more reliably.

In the display apparatus according to the embodiment of the present invention, in the thickness direction of the light guide plate, a size of the at least one contact prevention section may be larger than that of the light guide plate.

In the embodiment of the present invention, in the thickness direction of the light guide plate, the size of the at least one contact prevention section is larger than that of the light guide plate, which prevents the contact of the substrate and the light guide plate more reliably.

In the display apparatus according to the embodiment of the present invention, the at least one contact prevention section may have a bar-shape whose longitudinal direction is the thickness direction of the light guide plate, and may be arranged at a region proximal to the one surface of the substrate.

In the embodiment of the present invention, the at least one contact prevention section has the bar-shape, which can prevent the contact of the substrate and the light guide plate reliably, and the at least one contact prevention section is arranged at the region proximal to the one surface of the substrate and restricts the movement of the substrate, which prevents a position displacement of the substrate.

In the display apparatus according to the embodiment of the present invention, a heat radiation member may be provided at a region facing to the other surface of the light guide plate which is opposite to the one surface of the light guide plate, and the heat radiation member may be provided with a through-hole, in this case, one end portion of the at least one contact prevention section is inserted into the through-hole of the heat radiation member.

In the embodiment of the present invention, the one end portion of the at least one contact prevention section is inserted into the through-hole of the heat radiation member, which restricts the movement of the substrate more reliably to prevent the position displacement of the substrate reliably.

In the display apparatus according to the embodiment of the present invention, the at least one contact prevention section may be provided in a tip of the one end portion thereof with a pull-out locking section which stops the one end portion being pulled out from the through-hole of the heat radiation member.

In the embodiment of the present invention, the pull-out locking section can prevent the one end portion of the at least one contact prevention section being pulled out from the through-hole of the heat radiation member.

According to the embodiment of the present invention, it is possible to prevent the end portion of the light guide plate arranged proximate to the one side surface of the light guide plate from hitting the light emitting element so as to damage the light emitting element due to the thermal expansion or a certain cause.

The above and further objects and features will move fully be apparent from the following detailed description with accompanying drawings.

BRIEF DESCRIPTION OF THE SEVERAL VIEWS OF THE DRAWINGS

FIG. 1 is a front view showing an appearance of a television receiver according to Embodiment 1 of the present invention.

DETAILED DESCRIPTION

Figure 2:
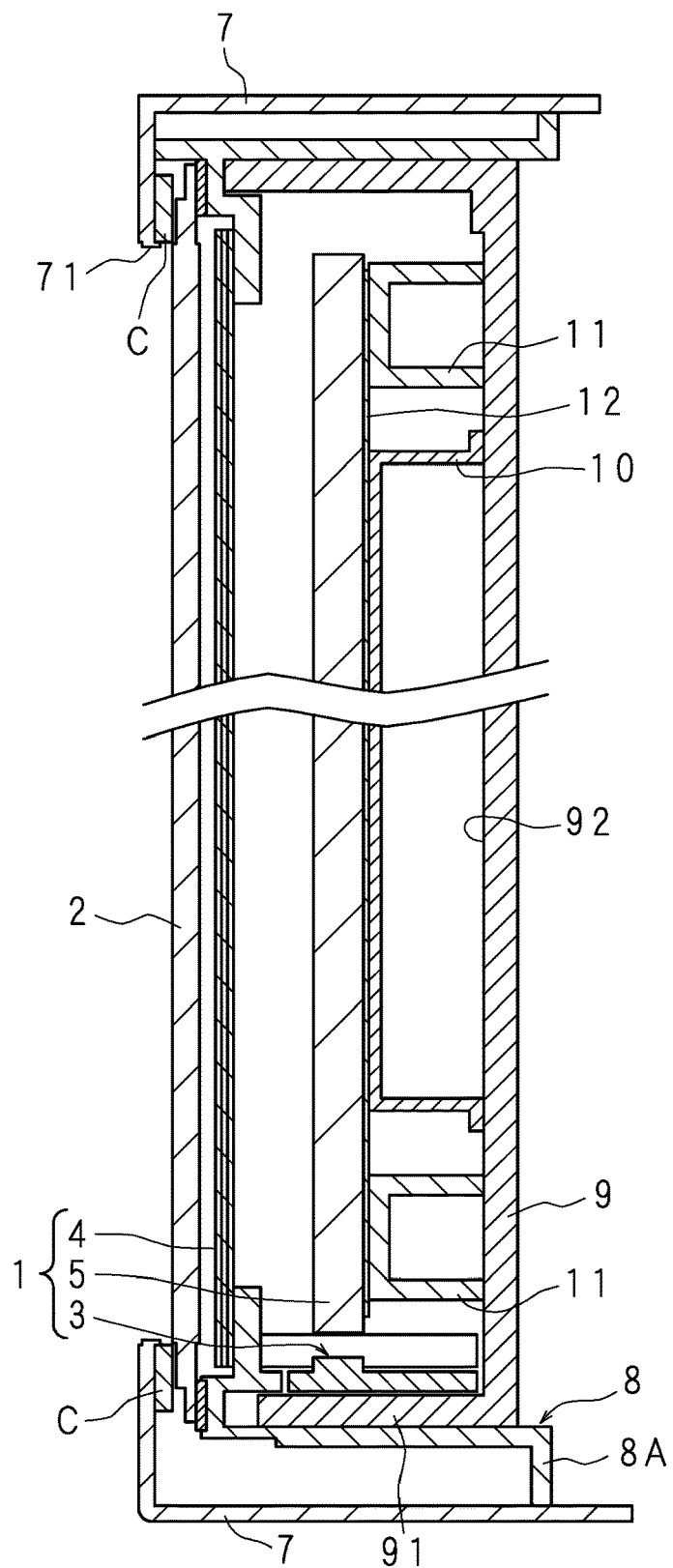
FIG. 2 is a longitudinal sectional view by a line A-A of FIG. 1.

The following description will explain examples in which display apparatuses according to Embodiments of the present invention are applied to a television receiver, based on drawings in detail.

Embodiment 1

FIG. 1 is a front view showing an appearance of a television receiver according to Embodiment 1 of the present invention. In FIG. 1, a reference numeral 100 indicates the television receiver according to Embodiment 1 of the present invention. Hereinafter, the right-and-left direction is referred to as a lateral direction in a plan view of the drawing, and the up-and-down direction is referred to as a vertical direction in the plan view of the drawing, for convenience of description.

FIG. 2 is a longitudinal sectional view by a line A-A of FIG. 1, and shows main sections of the television receiver 100 according to Embodiment 1 of the present invention. The television receiver 100 according to Embodiment 1 of the present invention comprises a rectangular liquid crystal display panel 2 which displays an image on one surface corresponding to a front side, as shown in FIG. 1. A light source device 1 which irradiates the liquid crystal display panel 2 with light is arranged at a region facing a back side of the liquid crystal display panel 2.

Figure 3:
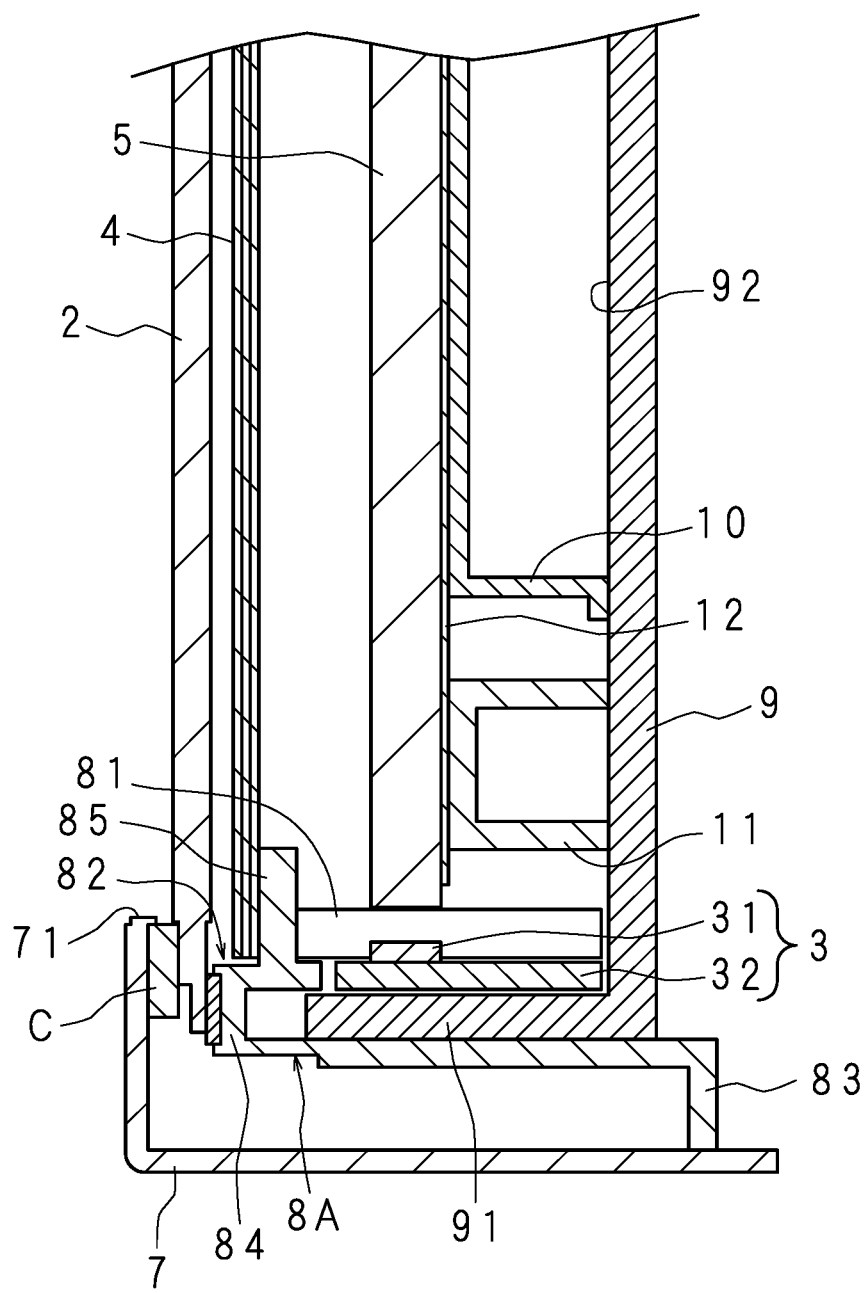
FIG. 3 is an enlarged view where a lower part of the longitudinal sectional view of FIG. 2 is enlarged.

The light source device 1 comprises a light source section 3, an optical sheet 4 and a light guide plate 5. FIG. 3 is an enlarged view where a lower part of the longitudinal sectional view of FIG. 2 is enlarged.

The optical sheet 4 is arranged so that one surface thereof faces the other surface of the liquid crystal display panel 2 which is opposite to the one surface of the liquid crystal display panel 2, and the light guide plate 5 is arranged so that one surface thereof faces the other surface of the optical sheet 4 which is opposite to the one surface of the optical sheet 4. A reflective sheet 12 is arranged so that one surface thereof faces the other surface of the light guide plate 5 which is opposite to the one surface of the light guide plate 5.

A front cover 7 is arranged near an edge of the liquid crystal display panel 2. The front cover 7 includes a hollow and rectangular display window 71 corresponding to a shape of the one surface of the liquid crystal display panel 2 to be visually recognized by a user. A user can visually recognize an image to be displayed on the one surface of the liquid crystal display panel 2 via the display window 71.

As shown in FIG. 2, in the liquid crystal display panel 2, a peripheral portion of the one surface is covered by the display window 71. In more detail, via a cushion C provided along the peripheral portion of the one surface of the liquid crystal display panel 2, the display window 71 presses the peripheral portion of the liquid crystal display panel 2 toward the light guide plate 5 to hold the liquid crystal display panel 2.

A polarizing plate (not shown) is provided on the other surface of the liquid crystal display panel 2, and the liquid crystal display panel 2 is configured to separate light entering through the polarizing plate into a P wave (horizontal deflection component) and an S wave (vertical deflection component) so that the P wave only propagates towards the one surface and the S wave is absorbed by the polarizing plate. The liquid crystal display panel 2 may be an electrophoresis liquid crystal panel, for example.

The optical sheet 4 is a known optical sheet, as well as performs the diffusion and condensing etc. of light which is emitted from the light source section 3 and which enters via the light guide plate 5, and emits more uniform light towards the liquid crystal display panel 2. For example, the optical sheet 4 includes two diffusion sheets and one prism sheet, and the prism sheet is arranged between the two diffusion sheets.

One of the two diffusion sheets, which is arranged proximate to the light guide plate 5, is an optical sheet which diffuses light entering from the light source section 3 via the light guide plate 5 and irradiates the prism sheet with the light. The prism sheet is an optical sheet which condenses light entering via the one of the two diffusion sheets and emits the light towards the other of the two diffusion sheets. Light passing through the prism sheet enters the other of the two diffusion sheets perpendicularly to the prism sheet.

The other of the two diffusion sheets, which is arranged proximate to the liquid crystal display panel 2, is an optical sheet which further diffuses light entering via the prism sheet to have a more uniform brightness distribution and emits the light towards the liquid crystal display panel 2.

The rectangular light guide plate 5 is arranged at a region proximal to the other surface of the optical sheet 4. The light guide plate 5 guides light emitted by the light source section 3 to the optical sheet 4 (liquid crystal display panel 2). For example, the light guide plate 5 may be constructed in the manner that the one surface thereof facing the other surface of the optical sheet 4 includes an emission surface provided with a pattern causing light entering from the light source section 3 to propagate towards the liquid crystal display panel 2. The light guide plate 5 can thereby change light entering from the light source section 3 into plane light to transmit the light through the emission surface to the optical sheet 4 uniformly.

The light guide plate 5 is made from a highly transparent acrylic resin, for example, and the reflective sheet 12 is arranged at a region facing the other surface of the light guide plate 5. That is, the one surface of the reflective sheet 12 faces the other surface of the light guide plate 5.

The reflective sheet 12 has a size approximately equal to that of the light guide plate 5 and a rectangular shape corresponding to that of the light guide plate 5. The reflective sheet 12 irregularly reflects light entering from the light source section 3 to the light guide plate 5 near the other surface of the light guide plate 5 so as to emit the light via the emission surface of the light guide plate 5.

A spacer 11 is arranged proximate to the other surface of the reflective sheet 12 which is opposite to the one surface of the reflective sheet 12 and in an edge portion of the reflective sheet 12. In other words, the edge portion of the reflective sheet 12 is supported by the spacer 11 to maintain an interval between the reflective sheet 12 and a later-described heat radiation plate 9 constant. The spacer 11 is gutter-shaped and the exterior of a bottom thereof contacts the other surface of the reflective sheet 12.

A so-called backlight chassis 10 is arranged proximate to the other surface of the reflective sheet 12 and in a portion except the edge portion of the reflective sheet 12 (hereinafter referred to as a residual portion). In other words, the residual portion of the reflective sheet 12 is supported by the backlight chassis 10 at other surface of the reflective sheet 12. The backlight chassis 10 is gutter-shaped and the exterior of a bottom thereof contacts the residual portion of the reflective sheet 12. That is, the interval between the reflective sheet 12 (the light guide plate 5) and the heat radiation plate 9 is maintained constant by the spacer 11 and the backlight chassis 10.

The heat radiation plate 9 (heat radiation member) is arranged so as to face the interiors of the bottoms of the spacer 11 and the backlight chassis 10. The heat radiation plate 9 is made of highly heat-conductive aluminum, for example. The spacer 11 and the backlight chassis 10 is held on one surface of the heat radiation plate 9.

The heat radiation plate 9 has a shape of a box provided with a rectangular bottom 92 corresponding to the light guide plate 5, and a size of the bottom 92 is approximately equal to that of the light guide plate 5. The heat radiation plate 9 is provided with side wall parts which rise from respective edges of the bottom 92 toward the light guide plate 5. A side wall part 91 of the side wall parts, which is arranged proximate to the light source section 3, is provided proximate to the other surface of a later-described substrate 32 of the light source section 3, the other surface of the substrate 32 being opposite to a one surface thereof, and along the other surface of the substrate 32. In other words, the side wall part 91 is arranged between the substrate 32 and a later-described panel holding member 8.

The television receiver 100 according to the present invention further comprises the panel holding member 8 which holds the above-described liquid crystal display panel 2, optical sheet 4 and light source section 3 and the like. The panel holding member 8 is made of a synthetic resin and is frame-shaped, for example, and is arranged along edge portions of the liquid crystal display panel 2 and the optical sheet 4. Hereinafter, call a lower edge portion of the panel holding member 8 in the vertical direction, i.e. a portion of the panel holding member 8 provided in the vicinity of the light source section 3 a lower panel holding member 8A.

As shown in FIG. 3, the lower panel holding member 8A is crank-shaped in a longitudinal sectional view and includes a holding section 82 provided with a step. The holding section 82 is arranged in the vicinity of end portions of the liquid crystal display panel 2 and the optical sheet 4. A later-described contact prevention section 81 is provided in one end portion of the holding section 82 arranged between the optical sheet 4 and the light guide plate 5. A support plate 83 is provided in the other end portion of the holding section 82 and extends from the other end portion along a thickness direction of the light guide plate 5.

The holding section 82 is provided with the step in the longitudinal sectional view as described above, and two flat parts are formed along a plane direction of the optical sheet 4. The end portion of the optical sheet 4 arranged proximate to the light source section 3 is held on one surface of a flat part 85 of the two flat parts, which is arranged proximate to the one end portion of the holding section 82.

The end portion of the liquid crystal display panel 2 arranged proximate to the light source section 3 is arranged via the cushion on one surface of a flat part 84 arranged proximate to the other end portion of the holding section 82. In other words, the end portion of the liquid crystal display panel 2, which is arranged on a lower side in the vertical direction, is held between the display window 71 of the front cover 7 via the cushion C and the flat part 84 of the lower panel holding member 8A.

The light source section 3 is arranged on the lower side in the vertical direction and in the vicinity of one side surface of the light guide plate 5. The light source section 3 is provided with a strip-shaped substrate 32 facing the one side surface of the light guide plate 5 and with a plurality of light sources 31, 31, . . . 31 (light emitting elements) mounted on one surface of the substrate 32 along a longitudinal direction of the substrate 32.

The light source 31 is a Cold Cathode Fluorescence Lamp (CCFL), an External Electrode Fluorescent Lamp (EEFL), a Hot Cathode Fluorescent Lamp (HCFL) or a Light Emitting Diode (LED) or the like, for example.

Figure 4:
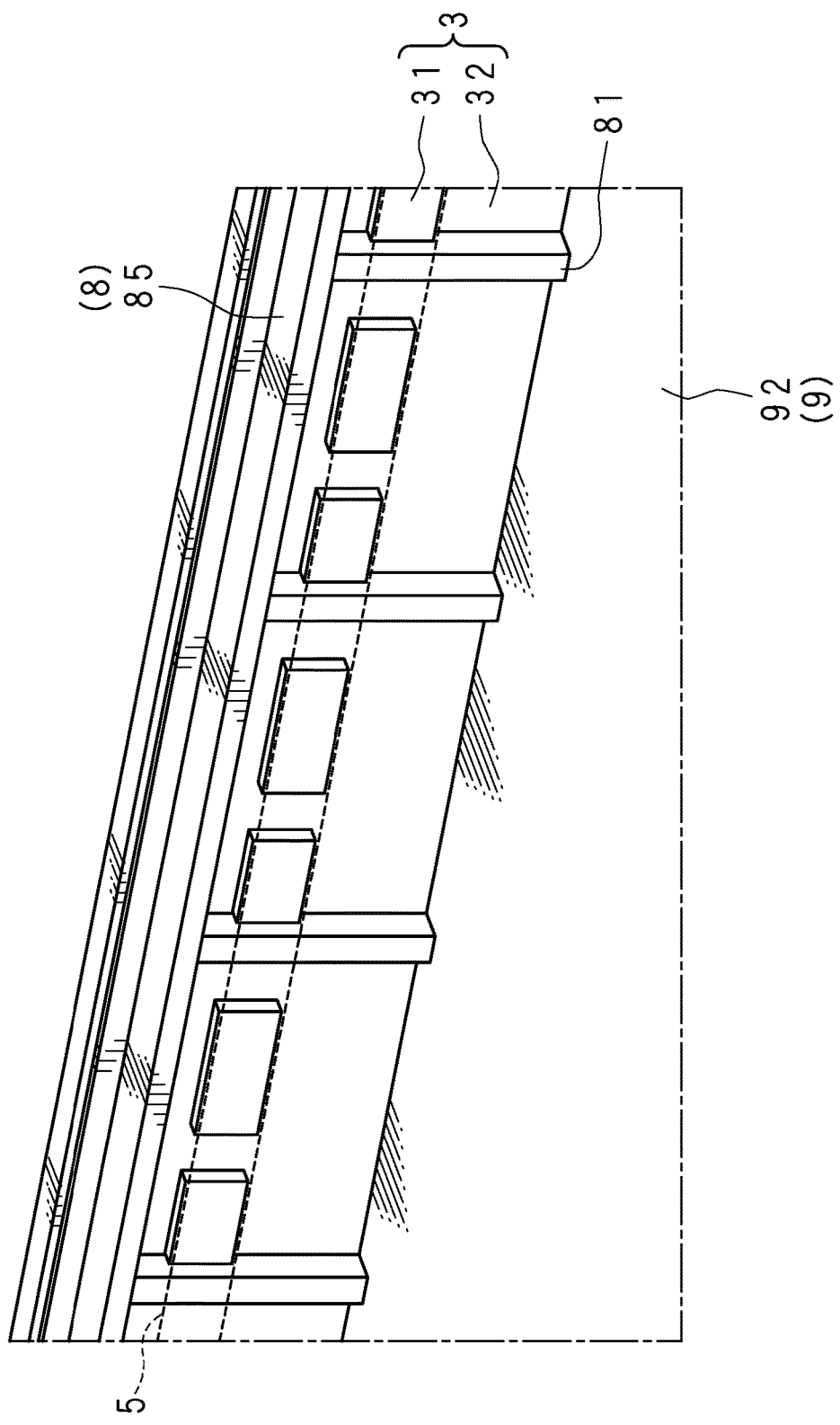
FIG. 4 is an explanatory view explaining a positional relation of a light source section, a light guide plate and a contact prevention section in the television receiver according to Embodiment 1 of the present invention.

The contact prevention section 81 is projected from the other surface of the flat part 85 of the holding section 82, the other surface of the flat part 85 being opposite to the one surface thereof. FIG. 4 is an explanatory view explaining a positional relation of the light source section 3, the light guide plate 5 and the contact prevention section 81 in the television receiver 100 according to Embodiment 1 of the present invention. For convenience of description, FIG. 4 shows a state where the liquid crystal display panel 2, the optical sheet 4 and the light guide plate 5 are omitted, and represents a position of the light guide plate 5 only with a dashed line.

The contact prevention section 81 has a shape of a square bar extending from the other surface of the flat part 85 along the thickness direction of the light guide plate 5. The contact prevention section 81 is provided so that two external surfaces opposing each other of four external surfaces face the one surface of the substrate 32 and the one side surface of the light guide plate 5, respectively. That is, the contact prevention section 81 is arranged between the substrate 32 and the light guide plate 5 and at a region proximal to the one surface of the substrate 32. The contact prevention sections 81 are provided at a plurality of places along the one surface of the substrate 32 apart from each other at a regular interval. Note that the contact prevention sections 81 may be provided at two places near both ends of the one side surface of the light guide plate 5 and may be further provided proximate to a central portion of the one side surface of the light guide plate 5 in a longitudinal direction thereof in addition to the two places, for example.

A size of the contact prevention section 81 in a longitudinal direction thereof, i.e., a size of the contact prevention section 81 in the thickness direction of the light guide plate 5 is larger than a thickness of the light guide plate 5. A size of the contact prevention section 81 in a direction where the one surface of the substrate 32 faces the one side surface of the light guide plate 5 is larger than that of the light source 31. In other words, the contact prevention section 81 is projected more than the light source 31 in a direction perpendicular to the one surface of the substrate 32.

In the television receiver 100 according to Embodiment 1 of the present invention, the contact prevention section 81 is arranged between the one surface of the substrate 32 and the one side surface of the light guide plate 5 in such a manner, and it is possible to prevent the light guide plate 5 from hitting the light source 31 due to the expansion of the light guide plate 5 or the impact from the outside, so as to prevent the damage of the light source 31 from occurring.

That is, the light source 31 emits heat with light during the operation of the television receiver 100, and the light guide plate 5 thereby thermally expands which is located near the light source 31. Generally, in order to enhance the brightness in the liquid crystal display panel 2, the light source 31 needs to be arranged as much as possible close to the one side surface of the light guide plate 5 with a small interval therebetween. Therefore, in a case where the thermal expansion of the light guide plate 5 occurs exceeding the interval, an end portion of the light guide plate 5 arranged proximate to the one side surface thereof hits the light source 31, and therefore the light source 31 may be damaged.

Moreover, in a case where an impact is made on the television receiver 100 from the outside thereof due to a certain cause, the light guide plate 5 vibrates due to such an impact and the end portion of the light guide plate 5 arranged proximate to the one side surface hits the light source 31, and therefore the light source 31 may be damaged.

By contrast, in the television receiver 100 according to Embodiment 1 of the present invention, as described above, the contact prevention section 81 is projected more than the light source 31 in the direction perpendicular to the one surface of the substrate 32. Therefore, in a case where the thermal expansion of the light guide plate 5 occurs or an impact is made from the outside, the contact prevention section 81 prevents the contact of the light guide plate 5 and the light source 31, so as to prevent the damage of the light source 31 from occurring.

Moreover, the contact prevention sections 81 are provided at the plurality of places along the one surface of the substrate 32 and the damage of the light source 31 due to the contact of the light guide plate 5 and the light source 31 can thereby be prevented from occurring more reliably.

Furthermore, in the television receiver 100 according to Embodiment 1 of the present invention, as described above, the contact prevention section 81 is arranged at a region proximal to the one surface of the substrate 32. Therefore, the contact prevention section 81 restricts the movement of the substrate 32, and it is possible to prevent a position of the substrate 32 from being displaced toward the one side surface of the light guide plate 5, due to a certain cause such as an impact from the outside of the television receiver 100.

Embodiment 1 may not be limited to this, and the contact prevention section 81 may be configured so as to contact the one surface of the substrate 32.

As described above, the contact prevention section 81 has the shape of the square bar, but is subjected to a chamfering process such as a C chamfering process or an R chamfering process with respect to an edge extending in the longitudinal direction of the contact prevention section 81. Therefore, even in a case where light emitted from the light source 31 diffuses during the propagating, the contact prevention section 81 does not disturb the propagating of the light.

The above description explains an example in which the contact prevention sections 81 are provided at the plurality of places along the one surface of the substrate 32, but the television receiver 100 according to Embodiment 1 of the present invention is not limited to this. One contact prevention section 81 may be provided proximate to a central portion of the one side surface of the light guide plate 5 in the longitudinal direction thereof, for example.

Moreover, the above description explains an example in which the light source section 3 is provided in a lower part of the vertical direction, but the television receiver 100 according to Embodiment 1 of the present invention is not limited to this. The light source section 3 may be provided in an upper part of the vertical direction, or one end part or both end part of the lateral direction, for example.

Moreover, the above description explains an example in which the contact prevention section 81 is bar-shaped, but the television receiver 100 according to Embodiment 1 of the present invention is not limited to this. The contact prevention section 81 may be a projection such as a hemisphere, and may be projected from the one surface of the substrate 32, for example.

Furthermore, the above description explains an example in which the contact prevention section 81 has the shape of the square bar, but the contact prevention section 81 is not limited to this, and may have a pentagonal bar-shape, a cylinder-shape, a shape of a prism and the like.

In the present invention, the contact prevention section 81 is formed integrally with the holding section 82 (panel holding member 8), which does not need a structural improvement for mounting the contact prevention section 81, and can save trouble for assembling of mounting the contact prevention section 81.

Moreover, the above description explains an example in which the contact prevention section 81 is provided in the holding section 82 (panel holding member 8), but the television receiver 100 according to Embodiment 1 of the present invention is not limited to this. The contact prevention section 81 may be provided in the substrate 32 or in the heat radiation plate 9, for example.

Embodiment 2

The television receiver 100 according to Embodiment 2 of the present invention has a configuration approximately similar to that of the television receiver 100 according to Embodiment 1, but configurations of the contact prevention section 81 and the heat radiation plate 9 are different from those in Embodiment 1. The following description will explain them in detail.

Figure 5:
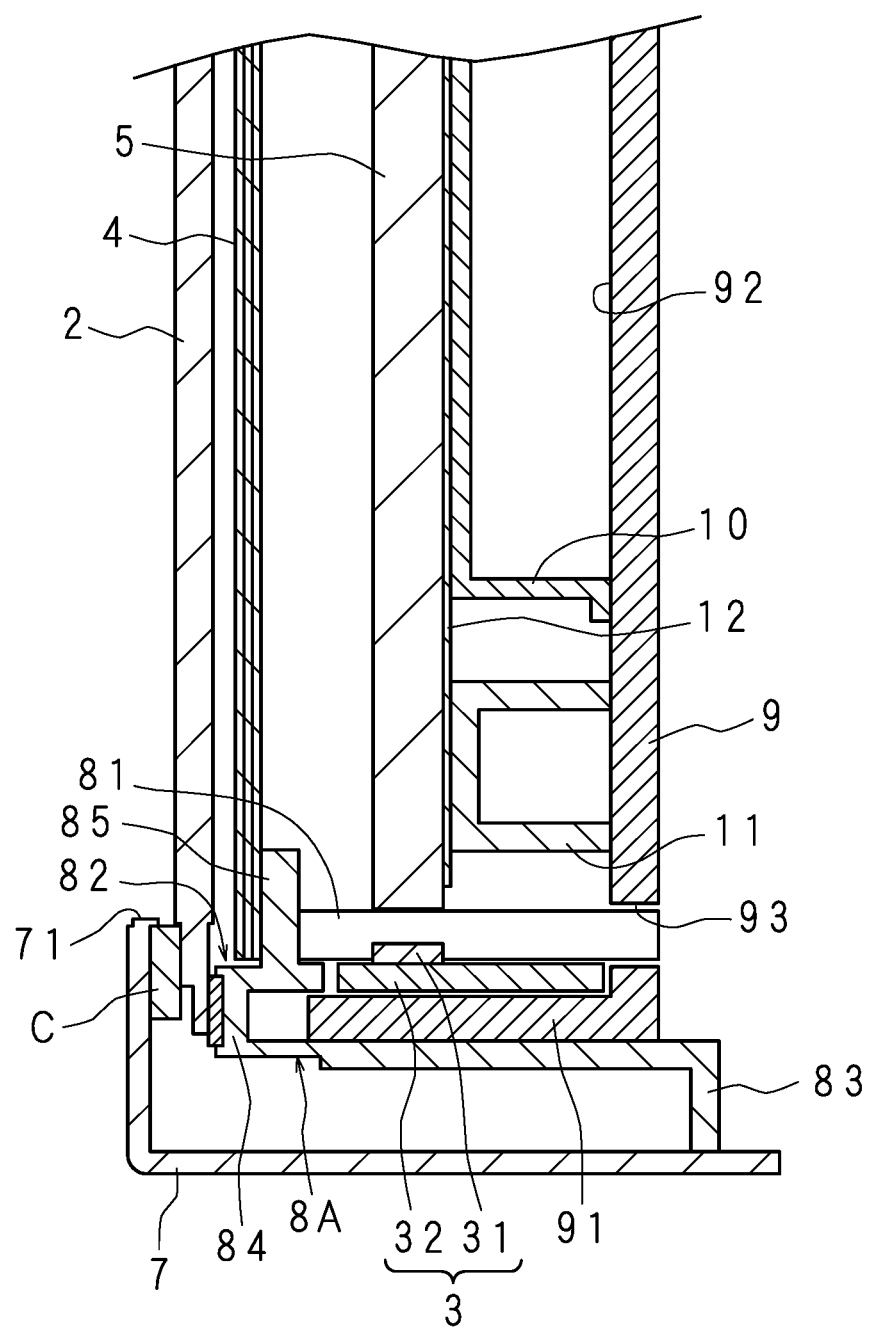
FIG. 5 is an enlarged view where a lower part of a longitudinal sectional view of a television receiver according to Embodiment 2 of the present invention is enlarged.

FIG. 5 is an enlarged view where a lower part of the longitudinal sectional view of the television receiver 100 according to Embodiment 2 of the present invention is enlarged. In the television receiver 100 according to Embodiment 2 of the present invention, a size of the contact prevention section 81 in the longitudinal direction thereof is larger than that in Embodiment 1. One end portion of the contact prevention section 81, which is arranged proximate to the heat radiation plate 9, is inserted into a later-described through-hole 93.

The heat radiation plate 9 is further provided with the through-hole 93 which passes through the heat radiation plate 9 in a thickness direction thereof at a position aligning with the contact prevention section 81 in the thickness direction of the heat radiation plate 9. The through-hole 93 has a shape corresponding to the contact prevention section 81, and has a size slightly larger than that of the contact prevention section 81.

That is, the through-hole 93 is rectangular as viewed in the thickness direction of the heat radiation plate 9, and is constructed in the manner that the one end portion of the contact prevention section 81, which is arranged proximate to the heat radiation plate 9, can be inserted into the through-hole 93.

Such a configuration can restrict the displacement of the substrate 32 more reliably and can prevent the position of the substrate 32 from being displaced due to a certain cause such as an impact from the outside more reliably.

The same parts as in Embodiment 1 are designated with the same reference numerals, and detailed explanations thereof are omitted.

Embodiment 3

The television receiver 100 according to Embodiment 3 of the present invention has a configuration approximately similar to that of the television receiver 100 according to Embodiment 1, but configurations of the contact prevention section 81 and the heat radiation plate 9 are different from those in Embodiment 1. The following description will explain them in detail.

Figure 6:
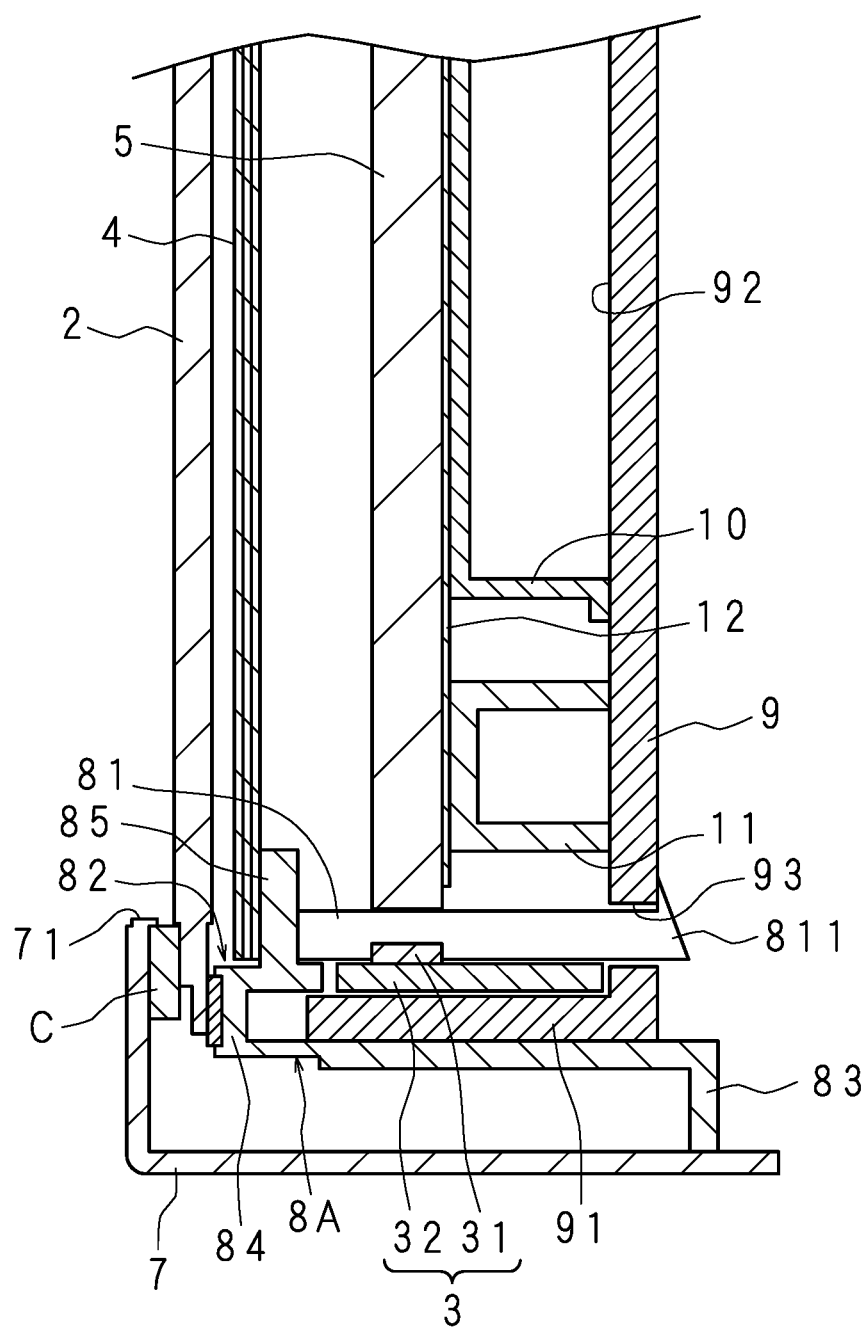
FIG. 6 is an enlarged view where a lower part of the longitudinal sectional view of the television receiver according to Embodiment 3 of the present invention is enlarged.

FIG. 6 is an enlarged view where a lower part of the longitudinal sectional view of the television receiver 100 according to Embodiment 3 of the present invention is enlarged. In the television receiver 100 according to Embodiment 3 of the present invention, a size of the contact prevention section 81 in the longitudinal direction thereof is larger than that in Embodiment 1 and the one end portion of the contact prevention section 81, which is arranged proximate to the heat radiation plate 9, is inserted into the through-hole 93.

A hook-shaped pull-out locking section 811 is provided in the one end portion of the contact prevention section 81 arranged proximate to the heat radiation plate 9. The pull-out locking section 811 stops the one end portion of the contact prevention section 81 being pulled out from the through-hole 93 of the heat radiation plate 9.

The heat radiation plate 9 is provided with the through-hole 93 which passes through the heat radiation plate 9 in the thickness direction thereof at the position aligning with the contact prevention section 81 in the thickness direction of the heat radiation plate 9. The through-hole 93 is previously explained in Embodiment 2, and a detailed explanation thereof is omitted.

Such a configuration can prevent the position of the substrate 32 from being displaced due to a certain cause such as an impact from the outside more reliably, also in the television receiver 100 according to Embodiment 3 of the present invention.

The same parts as in Embodiment 1 are designated with the same reference numerals, and detailed explanations thereof are omitted.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display apparatus comprising:
a substrate provided with one surface on which a light emitting element is mounted;
a light guide plate which is provided with one side surface facing the one surface of the substrate, which receives light emitted by the light emitting element through the one side surface and which emits the light from one surface thereof;
a display panel which displays an image on one surface thereof with light from the light guide plate;
an optical sheet provided with a first surface facing the other surface of the display panel which is opposite to the one surface of the display panel and with a second surface being opposite to the first surface and facing the one surface of the light guide plate; and
a holding section which holds the display panel and the optical sheet, the holding section is provided with a step formed by connecting a first flat part and a second flat part which are along the first surface of the optical sheet, and extends toward a space between the optical sheet and the light guide plate from outside of the space, wherein
the first flat part has a front surface receiving a peripheral edge of the other surface of the display panel, and
the second flat part has a front surface receiving a peripheral edge of the second surface of the optical sheet,
wherein at least one contact prevention section, which is arranged between the substrate and the light guide plate to prevent contact of them and has a bar-shape whose longitudinal direction is a thickness direction of the light guide plate, is connected to a rear surface of the second flat part of the holding section, the rear surface being opposite to the front surface of the second flat part, and in a direction where the one surface of the substrate faces the one side surface of the light guide plate, a size of the at least one contact prevention section is larger than that of the light emitting element.

2. The display apparatus according to claim 1, wherein a plurality of contact prevention sections, each of which corresponds to the at least one contact prevention section, are arranged at a plurality of places along the one surface of the substrate.

3. The display apparatus according to claim 1, wherein, in the thickness direction of the light guide plate, a size of each of the at least one contact prevention section is larger than that of the light guide plate.

4. The display apparatus according to claim 3, wherein, in the thickness direction of the light guide plate, a size of each of the at least one contact prevention section is larger than that of the substrate.

5. The display apparatus according to claim 1, wherein each of the at least one contact prevention section is arranged at a region proximal to the one surface of the substrate.

6. The display apparatus according to claim 1, further comprising a heat radiation member provided with a bottom part arranged at a region proximal to the other surface of the light guide plate which is opposite to the one surface of the light guide plate and with side wall parts rising from respective edges of the bottom part towards the light guide plate, a part of the side wall parts faces the other surface of the substrate which is opposite to the one surface of the substrate.

7. The display apparatus according to claim 6, wherein the bottom part of the heat radiation member is provided with a through-hole passing through the heat radiation member in a thickness direction of the heat radiation member, and one end portion of the at least one contact prevention section which is arranged distal from the holding section is inserted into the through-hole of the heat radiation member.

8. The display apparatus according to claim 7, wherein the at least one contact prevention section is provided in a tip of the one end portion thereof with a pull-out locking section which stops the one end portion being pulled out from the through-hole of the heat radiation member.

\* \* \* \* \*